United States Patent
Paley et al.

(10) Patent No.: US 7,237,046 B2
(45) Date of Patent: Jun. 26, 2007

(54) DATA STORAGE DEVICE WITH FULL ACCESS BY ALL USERS

(75) Inventors: Sasha Paley, Kfar Saba (IL); Arik Bovshover, Raanana (IL); Eyal Bychkov, Hod Hasharon (IL); Aran Ziv, Herzelia (IL)

(73) Assignee: SanDisk IL Ltd., Kfar Saba (IL)

( * ) Notice: Subject to any disclaimer, the term of this patent is extended or adjusted under 35 U.S.C. 154(b) by 0 days.

(21) Appl. No.: 10/810,566

(22) Filed: Mar. 29, 2004

(65) Prior Publication Data

US 2004/0193744 A1 Sep. 30, 2004

Related U.S. Application Data

(60) Provisional application No. 60/458,690, filed on Mar. 27, 2003.

(51) Int. Cl.
*G06F 3/00* (2006.01)
*G06F 13/14* (2006.01)
*G06F 13/00* (2006.01)
*G06F 5/00* (2006.01)

(52) U.S. Cl. .............................. 710/38; 710/36; 710/8; 710/11; 710/14

(58) Field of Classification Search .................. 710/36, 710/8, 11, 14, 38
See application file for complete search history.

(56) References Cited

U.S. PATENT DOCUMENTS

| | | | | |
|---|---|---|---|---|
| 6,073,226 A | * | 6/2000 | Cutshall et al. | 711/203 |
| 6,385,677 B1 | * | 5/2002 | Yao | 710/62 |
| 6,502,146 B1 | * | 12/2002 | Rasmussen et al. | 710/63 |
| 6,813,725 B1 | * | 11/2004 | Hanes et al. | 710/63 |
| 2002/0162009 A1 | * | 10/2002 | Shmueli et al. | 713/200 |
| 2003/0225765 A1 | * | 12/2003 | Frieden et al. | 707/9 |

* cited by examiner

*Primary Examiner*—Kim Huynh
*Assistant Examiner*—Joshua D Schneider
(74) *Attorney, Agent, or Firm*—Mark M. Friedman

(57) ABSTRACT

A peripheral device of a host computer includes a microcontroller and two virtual devices. The first virtual device passes, to the microcontroller, commands of a first command set from any user of the host computer and preferably also commands of a second command set from only privileged users of the host computer. The second virtual device passes, to the microcontroller, commands of the second set from any user of the host computer. In one physical implementation of the invention, the two virtual devices are implemented as separate physical devices, and the second device is connected to an interface to the host computer only if the user is not privileged. In another physical implementation of the invention, the two virtual devices are implemented in a common physical device, and a sector of a memory of the peripheral device is reserved for handling commands of the second set from non-privileged users.

5 Claims, 6 Drawing Sheets

DATA STORAGE DEVICE WITH FULL ACCESS BY ALL USERS

This is a continuation-in-part of U.S. Provisional Patent Application No. 60/458,690, filed Mar. 27, 2003

FIELD AND BACKGROUND OF THE INVENTION

The present invention relates to a detachable storage device, and, more particularly, to a detachable USB storage device that can be accessed fully by a user of a host computer regardless of the user's access privileges.

A keychain storage device is a detachable module that provide a disk-like storage area on which a user of a host computer can save data, and a USB interface that enables the module to communicate with the host computer. The focus of the present invention is on the means and methods of communications between the storage device and the host computer.

Existing operating systems include support for Mass Storage Class (MSC) USB devices. These devices are meant to provide the user of the host computer with simple storage, much like a hard disk. Standard access to MSC devices can be performed using the host computer's operating system without the need for privileged operation (such as an administrator in Microsoft's Windows operating system). Any special operations not defined under the standard require the use of a private command interface, not available unless in administrator mode. Examples of such special commands include passing a password to a secure storage device and setting the USB device's clock.

For some types of peripheral media, the operating system automatically executes a predefined file stored on the medium when the operating system recognizes that the medium has been connected to the computer. For example, when a data CD is inserted into the CD drive of a Windows system, the operating system finds and executes a file on the CD called "autorun.inf". With some operating systems, this feature is not available for simple removable storage devices, such as keychain storage devices.

These limitations of the operating system can be overcome by installing, in the host computer, a special device driver for the keychain storage device that allows any type of communications, and includes an automatic execution feature.

Such a device driver requires special development, and installation on all personal computers that the USB memory module is intended to be connected to. Because keychain storage devices are supposed to operate seamlessly on every computer the user works on, this is a major drawback. Furthermore, access of such a device driver also is limited by Windows to users with administrator privileges, for security. Administration privileges are usually not available to users. Even a manager who has administrator privileges in his/her own company is unlikely to be given such privileges in a venue outside that company such as an Internet café.

SUMMARY OF THE INVENTION

The present invention provides a method to enable driverless operation of keychain storage devices with existing operating systems, while enabling automatic execution and private command interface.

A first object of the present invention is to overcome the need of the prior art for using administrator privileges for communicating with the keychain storage device in private commands.

A second object of the present invention is to provide a method for automatic execution of any user application, once the keychain storage device has been inserted into the host computer.

Therefore, according to the present invention there is provided a peripheral device, for use with a host computer, including: (a) a microcontroller for executing commands received from the host computer; (b) a first virtual device for passing to the microcontroller a first set of the commands received from any user of the host computer; and (c) a second virtual device for passing to the microcontroller a second set of the commands received from any user of the host computer.

In addition, according to the present invention, in a system including a host computer and a peripheral device operationally connected to the host computer, the peripheral device including a microcontroller, a memory having a plurality of sectors, and a first virtual device operative to pass to the microcontroller for execution a first set of commands if received from any user of the host computer and a second set of commands only if received from a privileged user of the host computer, there is provided a method for enabling any user of the host computer to have the commands of the second set executed by the microcontroller, including the steps of: (a) including, in the peripheral device, a second virtual device operative to pass to the microcontroller for execution the second set of commands if received from any user of the host computer; (b) operationally connecting the peripheral device to the host computer; (c) sending a command of the second set from the host computer to the peripheral device, by a user of the host computer; (d) if the user is a privileged user, sending the command of the second set to the microcontroller via the first virtual device; and (e) otherwise, sending the command of the second set to the microcontroller via the second virtual device.

There also is provided, according to the present invention, a peripheral device, for use with a host computer, including: (a) a microcontroller for executing commands received from the host computer; (b) a first virtual device for passing the commands from the host computer to the microcontroller; and (c) a second virtual device, separate from the first virtual device, that supports autorun when the host computer detects a presence of the second virtual device in the peripheral device.

A basic peripheral device of the present invention includes a microcontroller for executing commands received from a host computer, and two virtual devices. The first virtual device passes to the microcontroller commands of a first command set (e.g., data access commands if the peripheral device is a mass storage device) no matter what privilege level the user of the host computer has. Preferably, the first virtual device also passes to the microcontroller commands of a second command set (e.g., special commands if the peripheral device is a mass storage device) only if those commands are issued by a user who has special privileges, for example if the user is an administrator or a super-user. The second virtual device passes the commands of the second set to the microcontroller no matter what privilege level the user of the host computer has. Preferably, the second virtual device passes any command to the microcontroller from any user of the host computer. One way in which this is accomplished is by making the microcontroller operative to receive the command, from the second virtual device, formatted as a native command of the second virtual device and to re-interpret the native command as the intended command.

Preferably, the peripheral device also includes a third virtual device that supports autorun when an operational connection of the peripheral device to the host computer is initiated.

Preferably, the peripheral device also includes an interface such as a USB interface for effecting an operational connection of the peripheral device to the host computer. If the interface is a USB interface, then preferably the first virtual device is a USB mass storage interface.

Preferably, the interface effects a simultaneous operational connection of both virtual devices to the host computer, so that the host computer has the option of sending commands to the microcontroller via either virtual device without the interface having to reconfigure itself. For example, if the interface is a USB interface, this simultaneous availability of both virtual devices to the host computer is effected by making the two virtual devices operative to be enumerated together by the host computer. Alternatively, the interface effects an alternate operational connection of the virtual devices to the host computer: at any given time, the host computer can access the microcontroller via either the first virtual device or via the second virtual device but not via both. For example, if the interface is a USB interface, this alternate availability of the virtual devices to the host computer is effected by making the two virtual devices operative to be alternately enumerated by the host computer: either the first virtual device is enumerated, or the second virtual device is enumerated, but not both virtual devices together.

Most preferably, the first two virtual devices, and the third virtual device if present, are sub-interfaces of the interface.

In one preferred embodiment of the peripheral device of the present invention, the first and second virtual devices are implemented in separate respective first and second physical devices within the peripheral device. The peripheral device also includes an interface for effecting an operational connection of the peripheral device to the host computer, and preferably also a switch for reversibly operationally connecting the second physical device to the interface. If the interface is a USB interface then preferably the second physical device is a USB HID sub-interface of the interface. Most preferably, the HID device includes a mechanism, such as a plurality of virtual multi-level LEDs, for representing the commands of the second set to the microcontroller and a mechanism, such as a plurality of virtual user switches, for representing the results of the commands of the second set to the host computer, even if the commands of the second set are not, strictly speaking, among the commands that the HID device has been configured formally to receive from the host computer.

If the peripheral device also includes the third virtual device, then the third virtual device also is implemented in the first virtual device. If the interface is a USB interface then the first physical device preferably is a multi-LUN USB sub-interface of the overall interface.

In another preferred embodiment of the peripheral device of the present invention, the first and second physical devices are implemented in a common physical device. Preferably, the peripheral device also includes a memory that includes a plurality of sectors. The first command set includes write commands for writing data to respective designated sectors of the memory. To get the common physical device to pass commands of the second set to the microcontroller from non-privileged users, the users embed the commands as data in the write commands of the first set whose designated sector is a sector that is reserved for commands of the second set. The reserved sector may be reserved either statically or dynamically.

The peripheral device preferably includes an interface for effecting an operational connection of the peripheral device to the host computer. If the interface is a USB interface then preferably the common physical device is a multi-LUN USB sub-interface of the interface.

The method of the present invention is directed at more effective use of the combination of a host computer with a peripheral device that includes a microcontroller, a memory having a plurality of sectors, and a first virtual device. The first virtual device passes to the microcontroller, for execution, commands of a first command set no matter what privilege level the user of the host computer has. The first virtual device passes to the microcontroller, for execution, commands of a second command set only if those commands are issued by a user who has special privileges, for example if the user is an administrator or a super-user.

The basic method of the present invention enables any user to issue the commands of the second set and have those commands executed by the microprocessor of the peripheral device. The basic method of the present invention has four steps. In the first step, a second virtual device is included in the peripheral device. The second virtual device passes to the microcontroller, for execution, commands of the second command set no matter what privilege level the user of the host computer has. In the second step, the peripheral device is operationally connected to the host computer. In the third step, the user sends a command of the second command set to the peripheral device. In the fourth step, the command of the second command set is sent to the microcontroller for execution: by the first virtual device if the user has the appropriate special privileges, and otherwise by the second virtual device, whose activity is interpreted by the microcontroller as a command of the second set.

Preferably, the method of the present invention also includes the further initial step of including, in the peripheral device, a third virtual device that supports autorun when the peripheral device is operationally connected to the host computer in the second step. The autorun determines whether the user has special privileges and so does not need the second virtual device to pass the command of the second command set to the microprocessor.

In one preferred embodiment of the method of the present invention, the first and second virtual devices are implemented in separate respective first and second physical devices within the peripheral device. The method includes the further step of operationally connecting the second physical device to the host computer only if the user does not have the special privileges needed to send the command of the second set to the microprocessor via the first virtual device.

In another preferred embodiment of the present invention, the first and second virtual devices are implemented in a common physical device. The method includes the further step of configuring the common physical device to recognize commands of the first command set that have embedded within themselves commands of the second command set. The command of the second command set is sent to the peripheral device by embedding that command in a command of the first command set and sending that command of the first command set to the peripheral device. At the peripheral device, the common physical device extracts the command of the second command set from the command of the first command set. Preferably, the commands of the first command set, that are recognized by the common physical device as possibly having embedded within themselves commands of the second command set, are write commands for writing to a memory sector that is reserved for commands of the second set. The commands of the second set are embedded within the commands of the first set as data to be written to that reserved sector. The sector may be reserved either statically or dynamically.

Another basic peripheral device of the present invention includes a microcontroller for executing commands received from a host computer and two virtual devices. The first virtual device passes the commands to the microcontroller. The second virtual device is separate from the first virtual device and supports autorun when the host computer detects the presence of the second virtual device in the peripheral device.

Preferably, the peripheral device also includes an interface for effecting an operational connection of the peripheral device to the host computer, and the two virtual devices are sub-interfaces of the interface. More preferably, the interface is a USB interface. Most preferably, the first virtual device is a USB mass storage interface and the second virtual device is a USB CD sub-interface of the interface.

Preferably, the two virtual devices are implemented in a common physical device. Most preferably, the peripheral device also includes an interface for effecting an operational connection of the peripheral device to the host computer, and the common physical device is a multi-LUN USB sub-interface of the interface.

BRIEF DESCRIPTION OF THE DRAWINGS

The invention is herein described, by way of example only, with reference to the accompanying drawings, wherein.

DESCRIPTION OF THE PREFERRED EMBODIMENTS

The present invention is of a detachable storage device that can be accessed fully by any user of a host computer to which the storage device is attached. Specifically, the present invention can be used to allow a user who lacks administrator privileges to issue special commands to a Mass Storage Class USB device.

The principles and operation of a detachable storage device according to the present invention may be better understood with reference to the drawings and the accompanying description.

Figure 1:
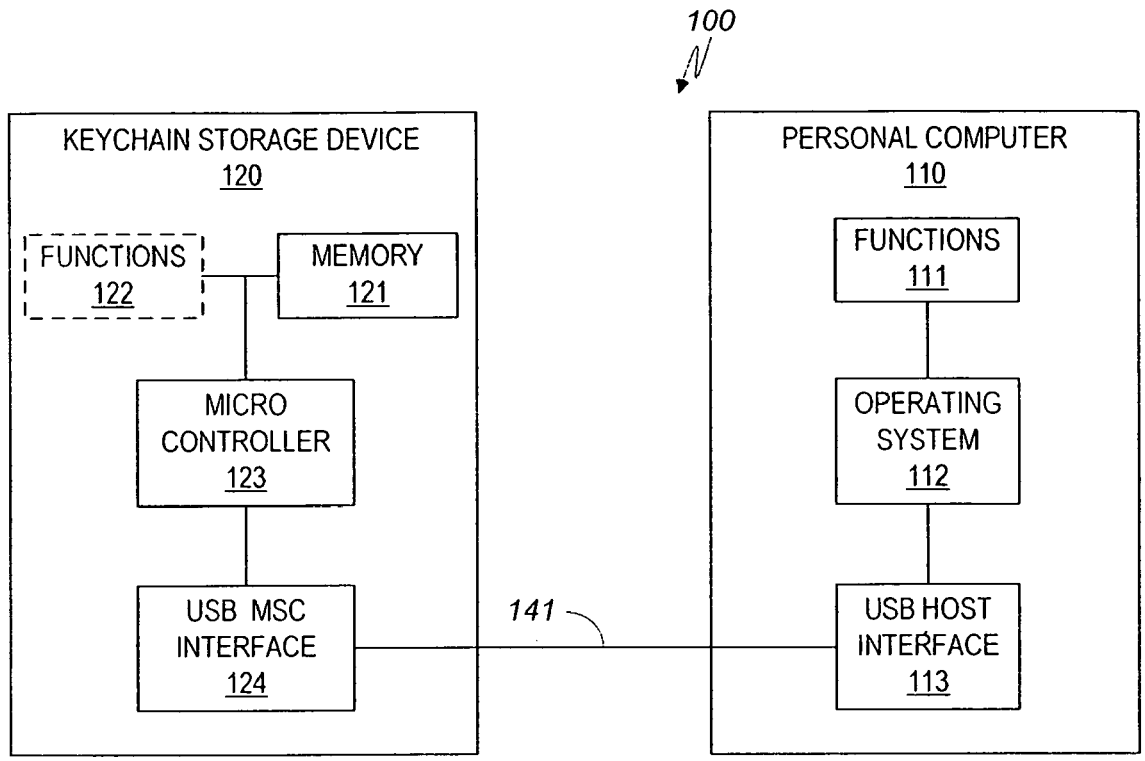
FIG. 1 is a simplified block diagram of a prior art system related to the present invention.

Referring now to the drawings, FIG. 1 illustrates a prior art system related to the present invention, generally designated 100. System 100 includes a personal computer (PC) 110 and a USB keychain storage device 120, connectable for data exchanges through a USB connection 141.

Keychain storage device 120 provides the user of PC 110 with the ability to store data in the device's non-volatile memory 121 and optionally with additional functions 122, such as security functions, data compression or signal processing. Device 120 contains a micro controller 123 that manages functions 122 and memory 121 on one hand, and communications through a USB mass storage class (MSC) interface 124 on the other. The USB MSC interface 124 is defined by the USB standard for mass storage class devices. This definition allows any PC 110 to interface with the keychain storage device 120 via USB connection 141, provided the PC 110 has a USB host interface 113 and that the operating system (OS) 112 of PC 110 contains support for USB MSC devices. If so, the user of PC 110 can use functions 111 of PC 110 in application programs to utilize the keychain storage device 120, e.g. writing a file to device 120, encrypting a file, reading a compressed file or recognizing a fingerprint stored on device 120.

Figure 2:
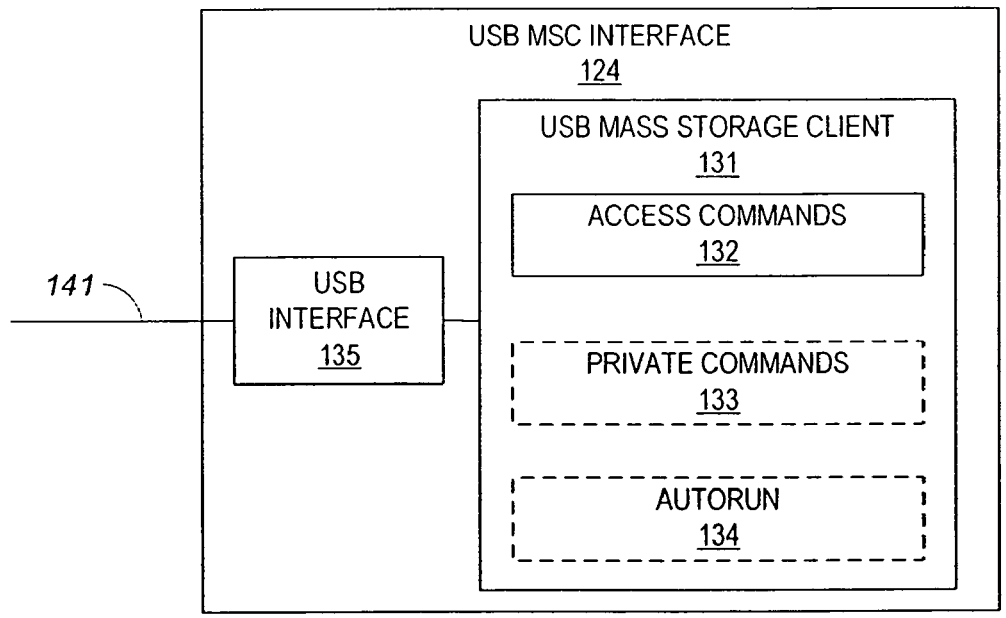
FIG. 2 is a simplified block diagram of a prior art USB keychain storage device related to the present invention.

FIG. 2 illustrates the command flow in USB keychain storage device 120. USB MSC interface 124 includes a USB interface 135 comprised of a USB connector, cabling and a list of USB endpoints for communications, as defined by the USB standard. Keychain storage device 120 is identified by PC 110 as a USB mass storage client 131. This client 131 can accept several command types: access commands 132, private commands 133 and autorun 134.

Access commands 132 are used to access data stored on keychain storage device 120, much like a regular disk. Examples of such commands include "read disk sector", "write disk sector" and "get disk size".

Optional private commands 133 are used to implement any additional functions 122 that are not disk-like storage functions. These functions depend on the type of device 120 at hand. For example, a secure storage device 120 accepts private commands 133 to send a password, or switch between secure and non secure modes. A biometric key device 120 accepts private commands 133 to verify the user's fingerprint. A signal processing key device 120 accepts private commands 133 to encode and decode voice or video data.

Autorun 134 is an optional feature that allows automatic execution of an application on PC 110 when keychain storage device 120 is connected to PC 110 via USB connection 141. If OS 112 recognizes autorun 134 for this class of device 120, then when PC 110 recognizes the connection, PC 110 automatically reads certain data from keychain storage device 120 and executes the program described in this data. An example of such data is the file "autorun.inf" which describes which application should be executed on a data CD-ROM.

Operating systems 112 commonly limit the way mass storage class devices 131 can be accessed. For instance, in Windows, when the user of PC 110 does not have administrator privileges, s/he cannot send private commands 133 to USB mass storage client 131.

Operating systems 112 commonly also limit the autorun 134 feature to specific device types. Most operating systems 112, do not recognize an autorun feature in generic mass storage clients 131.

To overcome these problems, prior art keychain storage devices 120 require the addition of another device driver to operating system 112 in order to use keychain storage device functions 122 such as private commands 133 and not just access commands 132 for managing memory 121. This device driver has to be installed on every PC 110 that the keychain storage device 120 is connected to. If the device driver is not installed, only the simple storage 121 features of the keychain storage device 120 can be used. Of course this is a major drawback to the device driver solution. The present invention presents a different approach to solve this problem.

Figure 3:
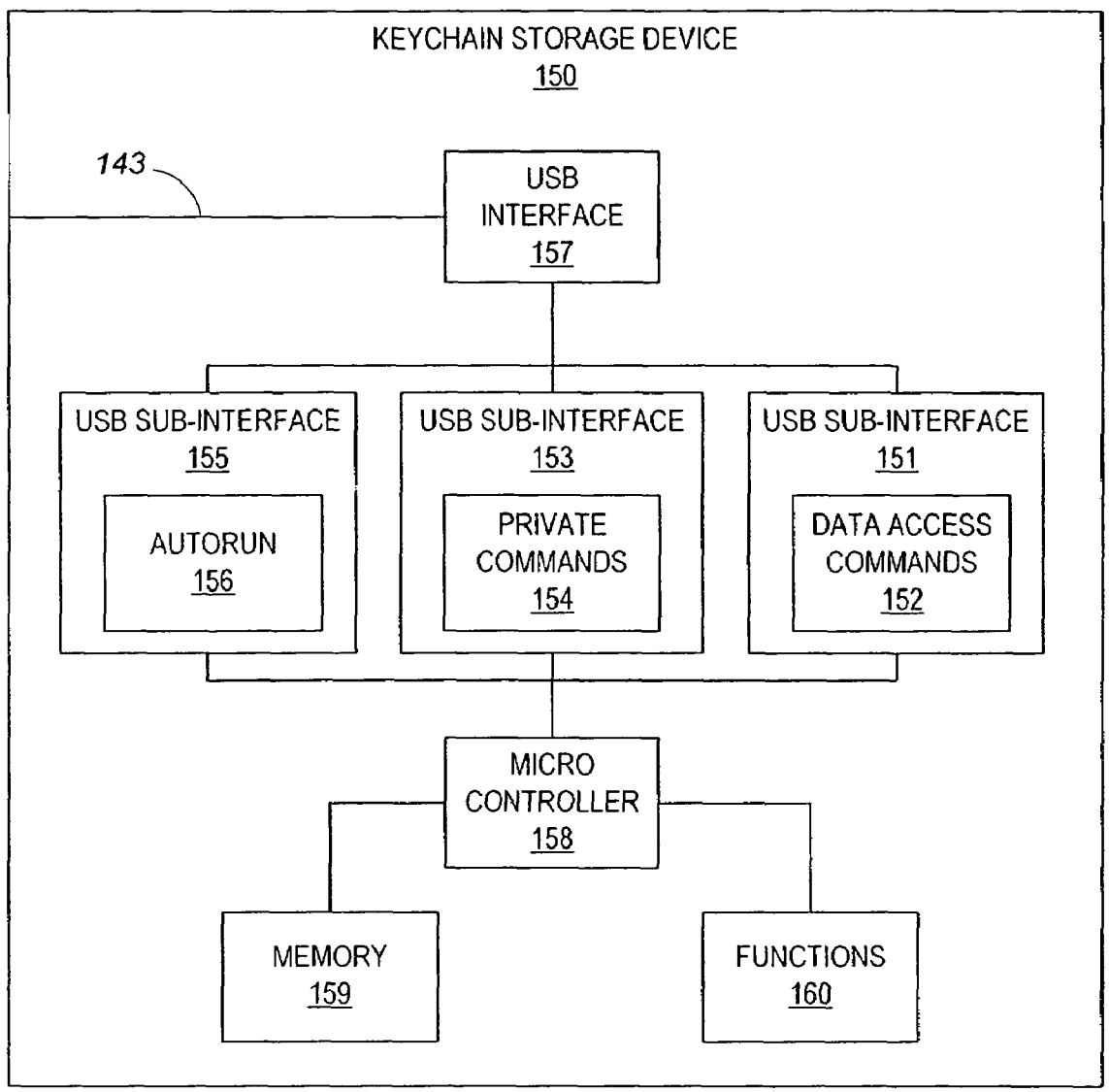
FIG. 3 is a simplified general block diagram of a USB keychain storage device, according to a preferred embodiment of the present invention.

Reference is now made to FIG. 3, which illustrates a preferred embodiment 150 of the present invention. Compared to the prior art of FIG. 2, the present invention as illustrated in FIG. 3 is comprised of multiple virtual USB devices 151, 153 and 155 used for the different types of commands discussed above: access commands 132, optional private commands 133 and autorun 134. The number of different devices used is specific to the application: other preferred embodiments of the present invention include only two such virtual devices, for example only virtual devices 151 and 155 as described below, or more than three such virtual devices.

Keychain storage device 150 includes, in addition to virtual USB devices 151, 153 and 155: a USB interface 150, a microcontroller 158, a nonvolatile memory 159 and built-in functions 160. USB interface 157 is an interface for a compound USB device that includes devices 151, 153 and 155. USB virtual devices 151, 153 and 155 are sub-interfaces of USB interface 157. USB interface 157 communicates with PC 110 via USB communication link 143. Device 151 is a USB mass storage client, similar to client 131, that contains the data access interface of keychain storage device 150. Functions 111 on the PC 110 using the disk-like storage features of the keychain storage device 150 reference this USB device 151. Device 153 is a USB device that is used by the present invention for private commands 154. This device 153 is a USB device of a type that is accessible from OS 112 even for non privileged users of PC 110. Microcontroller 158 re-interprets the commands received by device 153 as private commands 154. Device 155 is a USB device used to implement autorun feature 156. This device 155 is a type of USB device for which OS 112 activates autorun feature 156. An example of such a device is a USB CD device. Because virtual device 155 is separate from virtual device 151, storage device 150 supports autorun even if OS 112 does not recognize an autorun feature in virtual device 151. OS 112 recognizes both devices 151 and 155 in parallel and so is able to exploit all the functionality of both devices.

Micro controller 158 gathers the information from all the different USB virtual devices 151, 153 and 155 and handles the received requests with memory 159 resource and with other built in functions 160.

Keychain storage device 150 includes the three main features of the present invention—a disk-like data access 152, a private command 154 interface accessible without any special privileges from the OS 112 and an autorun feature 156.

Figure 4A:
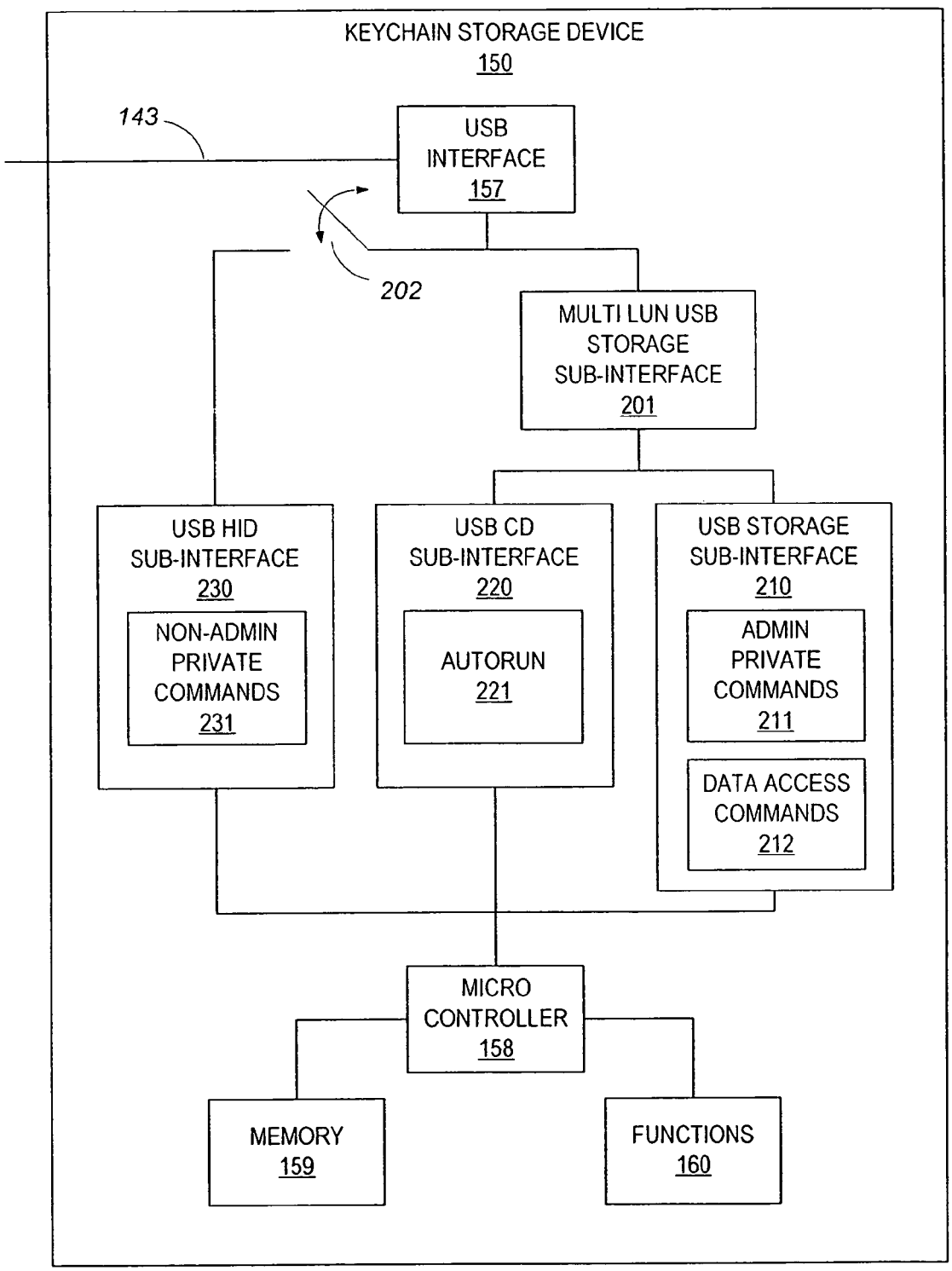
FIGS. 4A and 4B are simplified block diagrams of two physical implementations of the device of FIG.3.
Figure 4B:
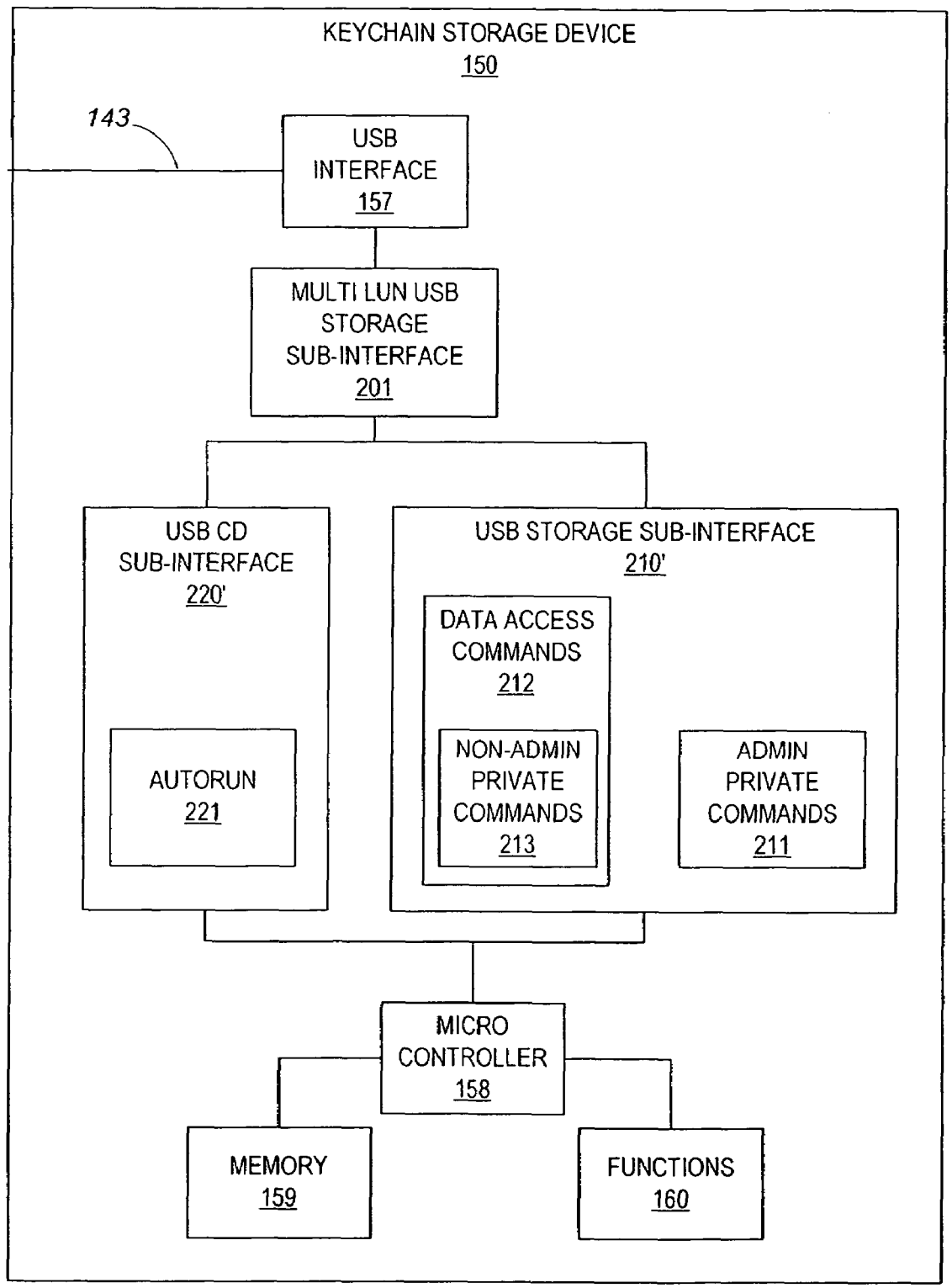

FIGS. 4A and 4B illustrate two different physical implementations of keychain storage device 150 of FIG. 3. Reference is now made to FIG. 4A, which schematically illustrates a physical implementation of USB keychain storage device 150 that uses the USB human interface device (HID) class to communicate private commands, and a USB CD device to perform the autorun feature. HID devices are always accessible even for non-administrators, because these devices are designed to interface with other devices, such as a keyboard, a mouse or a gamepad, that should always be accessible to any user, even to a user that lacks special privileges. The CD device driver in Windows includes an autorun feature. The idea behind this implementation is to implement the autorun feature of keychain storage device 150 using the CD autorun that is available from OS 112, and to implement the non administrative mode private communications using the HID interface that is freely accessible for non privileged users.

Keychain storage device 150 of FIG. 4A is comprised of three separate USB virtual devices—a USB human interface device (HID) 230, a USB CD device 220 and a USB storage device 210. CD device 220 and storage device 210 both belong to the USB mass storage class definition and, in accordance with the USB standard, are grouped into a multi LUN storage device sub-interface 201 made up of CD device 220 and storage device 210.

The interface for data access commands 212 in the implementation of FIG. 4A is via storage device 210. The autorun 221 feature is available via CD device 220. The private commands are available through two different interfaces, depending on the user's privileges on PC 110.

In privileged (Administrator in Windows) mode, private commands are sent via USB storage device 210 using the USB storage device private command interface 211 which is available for privileged users. This USB storage class private command interface 211 is a method supplied by OS 112 to allow functions 111 to send any private data structures to disk-like devices. Keychain storage device 150 of FIG. 4A uses this interface in the same way as prior art keychain storage devices 120 do.

In non privileged mode, the private commands are sent via USB HID interface 230 using the non privileged mode private command 231. A switch 202 is used to enable HID device 230 only when needed by the user—i.e. when working in non privileged mode on PC 110. Normally, a HID device, like a mass storage device, is configured to accept only a limited set of commands. Therefore, to use HID device 230 to communicate private commands 231 to keychain storage device 150 of FIG. 4A, PC 110 formats private commands 231 in a form acceptable to HID device 230, and microcontroller 158 interprets the commands received by HID device 230 accordingly as private commands 231. For example, in one preferred embodiment of the present invention, HID device 230 is defined as containing a number of virtual multi-level LEDs (8 bits for each LED), and a number of virtual user switches. HID device 230 also is defined as responsive to a set of native commands for turning the LEDs on and off and for returning to PC 110 the settings of the user switches. The LEDs function as an information channel from PC 110 to pass private commands 231 simply by writing the data bytes of the command to the 8-bit LEDs. The switches function as a method for PC 110 to read back results from private command 231. This is achieved because micro controller 158 can encode the bytes of the reply using those switches, much as private commands 231 themselves are encoded using the 8-bit LEDs. Note that this mechanism can be used for sending any command to keychain storage device 150 of FIG. 4A. Because storage device 210 is available for sending data access commands to keychain storage device 150 of FIG. 4A, the emphasis herein is on the use of HID device 230 for sending private commands to keychain storage device 150 of FIG. 4A.

User functions 111 of PC 110 should signal keychain storage device 150 of FIG. 4A that the HID interface is needed when working in non-administrative mode. This can be done by sending commands to USB CD device 220. For instance, sending a unique sequence of alternating eject and load commands to the USB CD device 220 closes switch 202. Then PC 110 is asked to enumerate USB device 150 again. After the re-enumeration, HID device 230 is recognized by the system and any further private commands 231 are sent to keychain storage device 150 of FIG. 4A via HID interface 230. Optionally, multi-LUN storage device sub-interface 201 does not respond to the re-enumeration, so that PC 110 now treats keychain storage device 150 as including only HID device 230. Under this option, special private commands 231 to HID device 230 must be defined so that user functions 111 can command keychain storage device 150 to open switch 202 and re-activate sub-interface 201 for another re-enumeration.

Reference is now made to FIG. 4B, which illustrates an alternative physical implementation of keychain storage device 150 of FIG. 3. The implementation of FIG. 4B uses a single multi LUN USB storage device sub-interface 201 to provide all three features—storage data access 152, private commands 154 and autorun 156. Multi LUN storage device sub-interface 201 is comprised of a USB CD device 220' and a USB storage device 210'.

In the implementation of FIG. 4B, the autorun is implemented by using a virtual USB CD device 220' that implements autorun 221. This is done in the same manner as described for the implementation of FIG. 4A.

USB storage device 210' handles the data access commands 212. USB storage device 210' also provides an interface 211 for privileged (administrator) users to communicate private commands. Again, this is done in the same manner as described for the implementation in FIG. 4A. Non-privileged users communicate private commands by packaging these commands inside data access commands 212.

A data access command 212 has three parts: a destination address, a transaction type and data. The destination address is a disk sector address, made up of head, cylinder and sector addresses. The destination address uniquely identifies one sector on disk drives. This address is translated by micro controller 158 to an address in memory 159. The transaction type is either a write operation, or a read operation, corresponding to data transfer from PC 110 to keychain storage device 150 or from keychain storage device 150 to PC 110. The data part is the data transferred in the transaction. The data can be transferred either from PC 110 to keychain storage device 150 or from keychain storage device 150 to PC 110, depending on the transaction type.

The non-administrative mode private commands 213 in the implementation of FIG. 4B are communicated via USB storage device 210' using data access commands 212 to specific disk sectors. Micro controller 158 receives the access request from the USB storage device 210 interface, and if the requested access is identified as belonging to a location (e.g. disk sector) specified as a private command location, the data part of the command is processed by micro controller 158. Otherwise the access is treated as a normal data access 212 and the data are transferred to or from the storage 159. To implement private commands from PC 110 to keychain storage device 150 of FIG. 4B, write transactions are used. To read results back from keychain storage device 150 of FIG. 4B, read operations are used by PC 110.

A disk sector allocated for private command communications 213 in non administrative mode must be accessible to non privileged users on PC 110. Non privileged users cannot perform direct access to disk sectors, but can only access the storage device 150 through the file system of the OS 112. Hence the special communication sector used for private commands 213 must be mapped to a file on the file system inside the USB storage device 210. This can be achieved in one of two ways.

The first way uses a statically reserved sector. When USB storage device 210' is formatted, a file in the device's file system is created that is stored in a known disk sector. Micro controller 158 parses all disk accesses 212 to look for access to that sector. When such access is detected by micro controller 158, action is taken according to the transaction type. If the transaction is a write transaction, then the data in the transaction are parsed as a private command 213. If the transaction is a read transaction then micro controller 158 returns the requested data in the data field of the data access 212, thus replying to PC 110 with a private command 213. Because the reserved sector belongs to a file, the reserved sector is marked as "used" in the file system, and OS 112 does not try to use that sector for any other file.

The second way uses a dynamically reserved sector. A certain sector is dynamically marked as accessible by data access commands 212 as a sector used for private commands 213. When the transaction is finished the dynamically marked sector is freed. To create a private command channel 213, functions 111 on PC 110 create a new file on USB storage device 210' and write certain initialization data to that file. Keychain storage device 150 of FIG. 4B receives this information via the data access commands 212 of USB storage device 210'. Micro controller 158 parses the data in the commands, and finds the unique initialization data in the data field. Micro controller 158 then marks the dynamically reserved sector as a communication sector for private commands 213. Any further access is parsed as a private command 213, just as in the use of a statically reserved sector. Functions 111 of PC 110 can now access the reserved sector again by overwriting, with private command data, the special file that PC 110 created. To terminate the use of this file, a private command 213 notifying termination of communications is sent, and micro controller 158 stops monitoring access to the reserved sector.

Figure 5A:
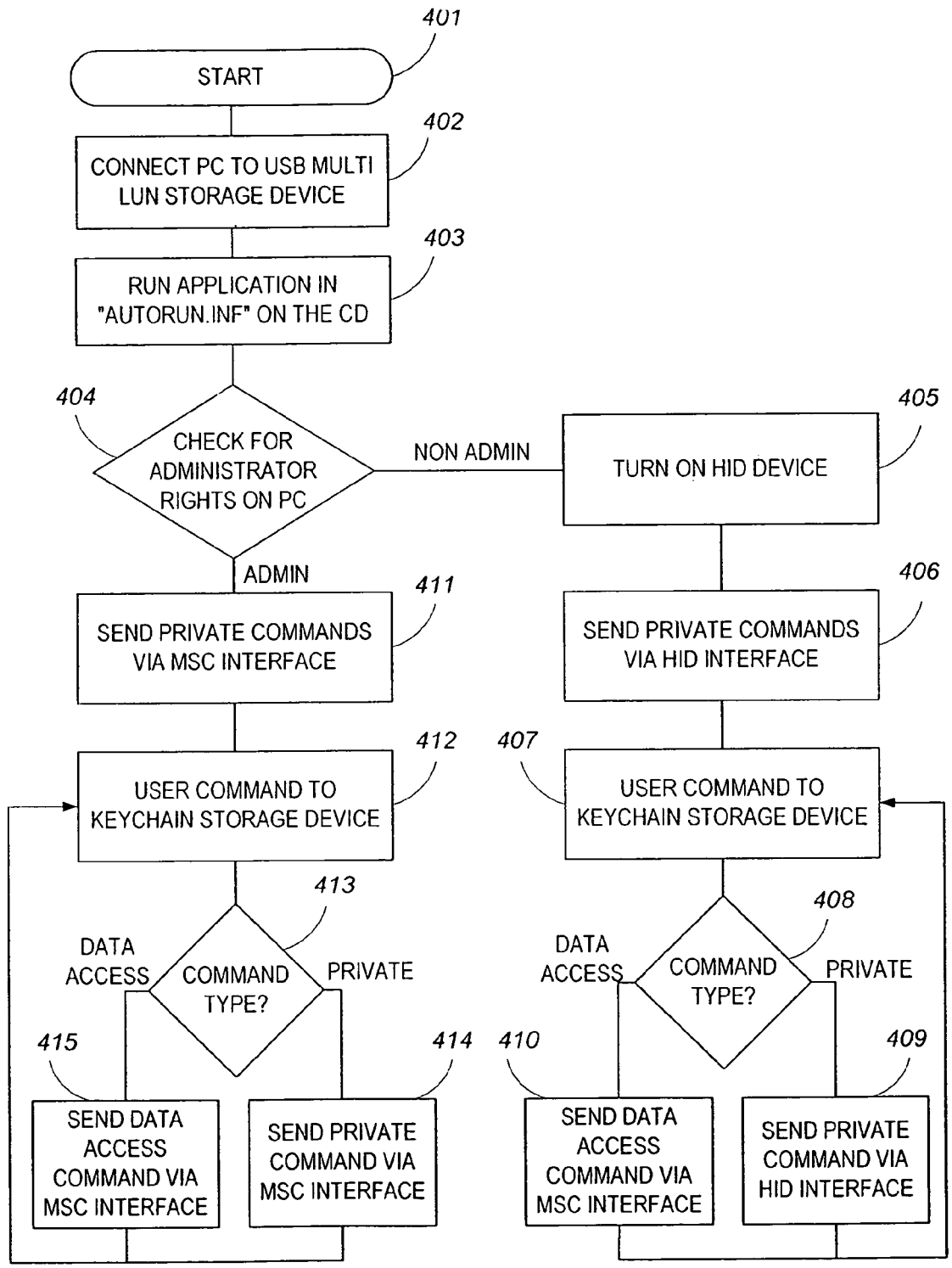
FIGS. 5A and 5B are schematic flowcharts describing the preferred modes of operation of the implementations illustrated in FIGS. 4A and 4B.
Figure 5B:
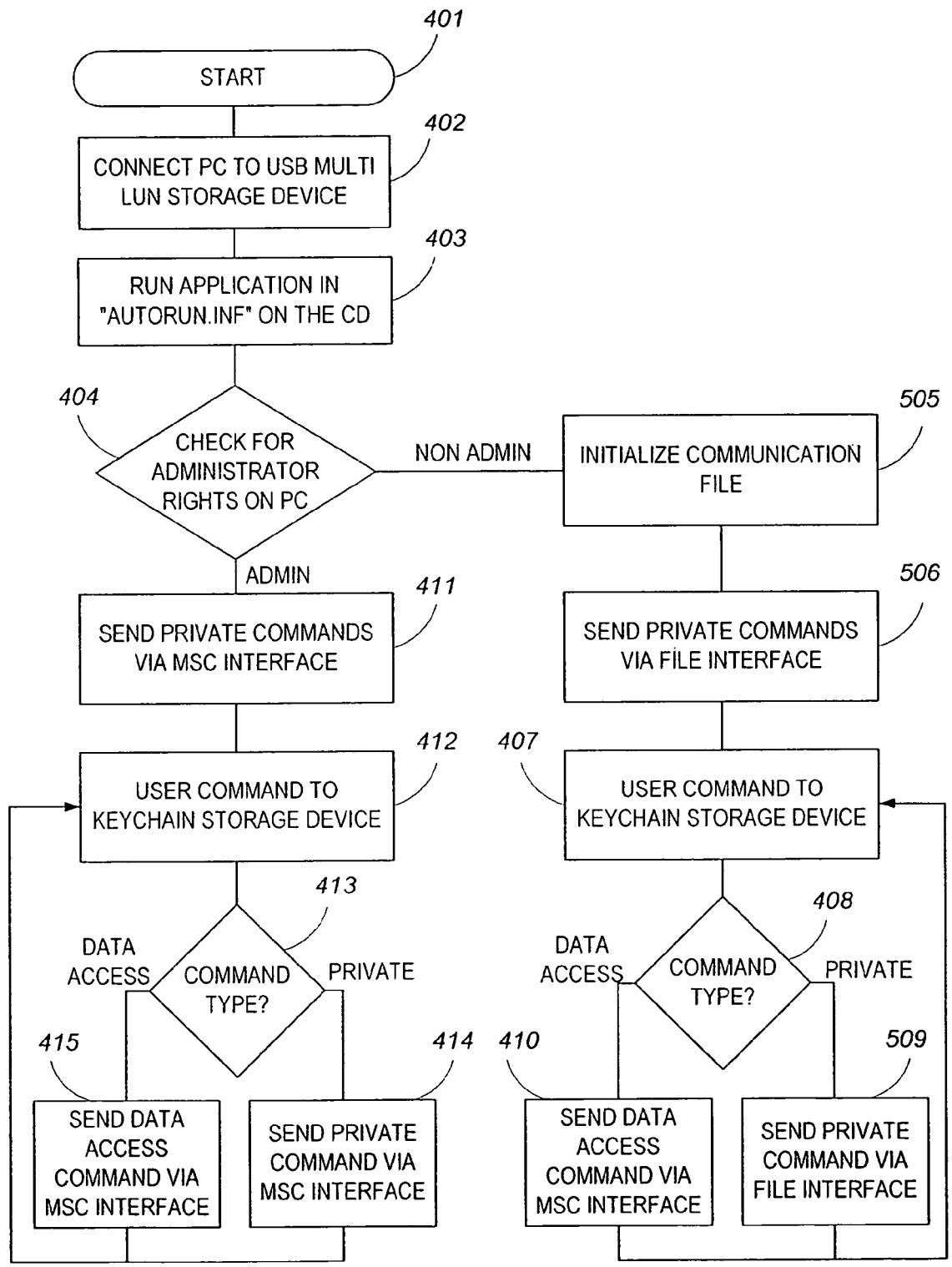

FIGS. 5A and 5B are flowcharts of typical operation of the implementation options illustrated in FIGS. 4A and 4B, respectively. Reference is now made to FIG. 5A that presents the mode of operation of a keychain storage device 150 of FIG. 4A. The procedure starts at step 401 in which keychain storage device 150 and PC 110 are separate. In step 402 keychain storage device 150 is attached to PC 110 and is identified as a multi LUN storage device 201 containing a USB CD device 220 and a USB storage device 210. In step 403 the autorun application is executed from USB CD device 220. On Windows platforms, that means reading the file "autorun.inf" from USB CD device 220 and executing the application listed in that file. In step 404 the automatically executed application (or any other function 111) checks whether the user of PC 110 has administrator rights. In case the user doesn't have administrator rights, the flow turns to step 405, in which the PC 110 application signals keychain storage device 150 to turn on HID interface 230 by closing switch 202. After switch 202 has been closed, keychain storage device 150 logically disconnects itself from PC 110 and reconnects itself with HID device 230 active. PC 110 enumerates USB interface 157 and finds a USB HID device 230 and a multi LUN storage device 201 comprised of a USB CD device 220 and a USB storage device 210. In step 406 HID interface 230 for private commands 231 is used to send some initialization private commands to keychain storage device 150. For example, a private command would be used to send a password to a keychain storage device 150 that is password-protected. In step 407 functions 111 of PC 110 decide to send some commands to keychain storage device 150. In step 408 functions 111 check if they should send a private command 231 or a data access command 212 to keychain storage device 150. If a data access command 212 is required, the command is sent to USB storage device 210 in step 410. If a private command 231 is required, the command is sent to HID device 230 in step 409. After transmission of the command the flow returns to step 407 for any further commands needed. Going back to step 404, if the user is an administrator on PC 110 the flow continues to step 411 in which a private command 211 is sent via the USB mass storage class private command interface 211. In step 412 functions 111 on PC 110 decide to send some commands to keychain storage device 150. In step 413 functions 111 check if they should send a private command 211 or a data access command 212 to keychain storage device 150. If a data access command 212 is required, the command is sent to USB storage device 210 in step 415. If a private command 211 is required, the command is send to USB storage device 210 in step 414. After transmission of the command, the flow returns to step 412 for any further commands needed.

A bug in the Windows operating system presently prevents even a user having administrator privileges from sending both data access commands and private commands to a keychain storage device 150 with the physical implementation illustrated in FIG. 4A. Pending the fixing of this bug, even a user with administrator privileges must use the "NON-ADMIN" branch of FIG. 5A. In a corresponding, less preferred embodiment of the present invention, USB storage device 210 lacks private command interface 211 and includes only data access command interface 212. This bug also prevents PC 110 from enumerating both multi-LUN sub-interface 201 and HID sub-interface 230 together, so the option described above of inactivating multi-LUN sub-interface 201 while HID sub-interface 230 is active must be used.

Reference is now made to FIG. 5B. Only the differences from FIG. 5A will be described. In step 404, if the user does not have administrative rights on PC 110, the flow turns to step 505. In step 505 the private command interface 213 is initialized. If the implementation contains a special file used for communicating private commands 213, this file is opened in this stage. If the implementation contains a dynamic sector allocation for private commands 213, the file for the sector is created and associated with private command interface 213 by writing the unique initialization sequence to the new file, and then rewinding the file pointer. In step 506 private commands are sent to command file interface 213. The flow continues as in FIG. 5A until step 408. If a private command is required, this command is sent in step 509 via the special file interface 213.

As noted above, the scope of the present invention also includes a peripheral storage device with a virtual USB device such virtual USB device 151 for accepting data access commands (and also for accepting private commands from a privileged user) and a separate virtual USB device such as virtual USB device 155 for supporting autorun, but without a virtual USB device such as virtual USB device 153 for accepting private commands from any user. If USB HID device 230 and switch 202 are deleted from FIG. 4A, then FIG. 4A illustrates a physical implementation of one such device.

While the invention has been described with respect to a limited number of embodiments, it will be appreciated that many variations, modifications and other applications of the invention may be made.

What is claimed is:

1. In a system including a host computer and a peripheral device operationally connected to the host computer, the peripheral device including a microcontroller, a memory having a plurality of sectors, and a first virtual device operative to pass to the microcontroller for execution a first set of commands if received from any user of the host computer and a second set of commands only if received from a privileged user of the host computer, a method for enabling any user of the host computer to have said commands of said second set executed by the microcontroller, comprising the steps of:
   (a) including, in the peripheral device, a second virtual device operative to pass to the microcontroller for execution the second set of commands if received from any user of the host computer, said second virtual device being implemented along with the first virtual device in a common physical device within the peripheral device;
   (b) operationally connecting the peripheral device to the host computer;
   (c) sending a command of said second set from the host computer to the peripheral device, by a user of the host computer;
   (d) if said user is a privileged user, sending said command of said second set to the microcontroller via the first virtual device;
   (e) otherwise, sending said command of said second set to the microcontroller via said second virtual device; and
   (f) configuring said common physical device to recognize commands, of said first set, wherein said commands of said second set are embedded;
wherein said sending of said command of said second set to the peripheral device is effected by steps including:
   (i) embedding said command of said second set in a command of said first set; and
   (ii) sending said command of said first set to the peripheral device;
and wherein said sending of said command of said second set to the microcontroller via said second virtual device is effected by steps including extracting said command of said second set from said command of said first set.

2. The method of claim 1, further comprising the step of:
   (f) including, in the peripheral device, a third virtual device that supports autorun when said operational connecting is effected, said autorun determining whether said user is a privileged user.

3. The method of claim 1, wherein said commands of said first set, that are recognized by said common physical device as having embedded therein said commands of said second set, are write commands for writing to a sector of the memory that is reserved for said commands of said second set.

4. The method of claim 3, further comprising the step of:
   (f) reserving said sector statically.

5. The method of claim 3, further comprising the step of:
   (f) reserving said sector dynamically.

* * * * *